(12) United States Patent
Och et al.

(10) Patent No.: US 12,533,946 B2
(45) Date of Patent: Jan. 27, 2026

(54) CHARGE, FUEL, OR SERVICE RECESS FOR A VEHICLE

(71) Applicant: Illinois Tool Works Inc., Glenview, IL (US)

(72) Inventors: Roland Och, Rottendorf (DE); Jürgen Herzig, Buchbrunn (DE)

(73) Assignee: Illinois Tool Works Inc., Glenview, IL (US)

( * ) Notice: Subject to any disclaimer, the term of this patent is extended or adjusted under 35 U.S.C. 154(b) by 328 days.

(21) Appl. No.: 18/306,543

(22) Filed: Apr. 25, 2023

(65) Prior Publication Data

US 2023/0347732 A1 Nov. 2, 2023

(30) Foreign Application Priority Data

Apr. 27, 2022 (DE) ...................... 10 2022 110 264.5

(51) Int. Cl.
*B60K 15/05* (2006.01)
*B60L 53/16* (2019.01)

(52) U.S. Cl.
CPC .............. *B60K 15/05* (2013.01); *B60L 53/16* (2019.02); *B60K 2015/0538* (2013.01); *B60K 2015/0561* (2013.01)

(58) Field of Classification Search
CPC ............ B60K 15/05; B60K 2015/0538; B60K 2015/0561; B60L 53/16
See application file for complete search history.

(56) References Cited

U.S. PATENT DOCUMENTS

| | | | | |
|---|---|---|---|---|
| 5,501,607 A | * | 3/1996 | Yoshioka | E05D 11/105 220/259.2 |
| 5,580,258 A | * | 12/1996 | Wakata | B60L 53/16 220/259.2 |
| 8,961,204 B2 | * | 2/2015 | Hara | H01R 13/5213 439/142 |

(Continued)

FOREIGN PATENT DOCUMENTS

| CN | 217994705 U | 12/2022 |
|---|---|---|
| CN | 218386007 U | 1/2023 |

(Continued)

*Primary Examiner* — Brian L Swenson
(74) *Attorney, Agent, or Firm* — McAndrews, Held & Malloy, Ltd.

(57) ABSTRACT

Disclosed is a charging, fueling, or service compartment system for a vehicle. The charging, fueling, or service compartment system having a compartment body, at least one terminal or connection region for a charging plug or an equipment gun, and a movable compartment body cover. The charging, fueling, or service compartment system further includes a movable cover associated with the at least one terminal or connection region. The cover associated with the at least one terminal or connection region associated with a mechanism, which is directly or indirectly operatively connected to the compartment body cover such that when the compartment body cover is transferred from its closed position into its open position, the cover associated with the at least one terminal or connection region is moved along in such a way that the cover associated with the at least one terminal or connection region is preferably moved synchronously from movable.

21 Claims, 13 Drawing Sheets

(56) References Cited

U.S. PATENT DOCUMENTS

| | | | |
|---|---|---|---|
| 9,895,985 | B2 | 2/2018 | Takahashi |
| 10,259,315 | B2 | 4/2019 | Jobst |
| 11,951,825 | B2* | 4/2024 | Schurz ............... B60K 15/0406 |
| 2023/0061089 | A1 | 3/2023 | Ha |
| 2023/0061574 | A1* | 3/2023 | Mensch .................... E05F 1/10 |
| 2024/0110427 | A1* | 4/2024 | Göpfert ................. B60K 15/05 |
| 2024/0375533 | A1* | 11/2024 | Tanaka .................... B60L 53/11 |

FOREIGN PATENT DOCUMENTS

| | | |
|---|---|---|
| DE | 102011014462 A1 | 9/2012 |
| DE | 102011076927 A1 | 12/2012 |
| DE | 102015214713 A1 | 2/2017 |
| DE | 102017222061 A1 | 1/2019 |
| DE | 102017222503 A1 | 6/2019 |
| DE | 102018124996 A1 | 4/2020 |
| DE | 102019103047 B3 | 7/2020 |
| DE | 102019112750 A1 | 11/2020 |
| DE | 102020006569 A1 | 12/2020 |
| DE | 102021000307 A1 | 3/2021 |
| DE | 102021000765 A1 | 4/2021 |
| DE | 102021000766 A1 | 4/2021 |
| DE | 102021003654 A1 | 11/2021 |
| DE | 102021006063 A1 | 2/2022 |
| DE | 102021006064 A1 | 2/2022 |
| DE | 102021006076 A1 | 2/2022 |
| DE | 102021006077 A1 | 2/2022 |
| DE | 102021006078 A1 | 2/2022 |
| DE | 102020201574 B4 | 6/2022 |
| DE | 102022001416 A1 | 6/2022 |
| DE | 102022001702 A1 | 8/2022 |
| DE | 102021116318 A1 | 12/2022 |
| DE | 202022104963 U1 | 12/2022 |
| DE | 102021123430 A1 | 3/2023 |
| DE | 102021214181 A1 | 3/2023 |
| EP | 3196064 B1 | 5/2019 |
| FR | 2972081 B1 | 3/2013 |

* cited by examiner

CHARGE, FUEL, OR SERVICE RECESS FOR A VEHICLE

RELATED APPLICATIONS

The present application claims the benefit of German Patent Application No. 10 2022 110 264.5, filed Apr. 27, 2022, titled "Charge, Fuel, Or Service Recess for a Vehicle," the contents of which are hereby incorporated by reference.

BACKGROUND

Vehicles with a hybrid or electric drive usually have one battery or traction battery, which, for example in the case of PHEV vehicles (PHEV=plug-in hybrid electric vehicle) or BEV vehicles (BEV=battery electric vehicle), can be charged via an electrical charging connector that is accessible from the outside on the vehicle body, and is typically a charging port, by connecting to an electrical charging station, for example, or a conventional external electrical terminal.

The charging port is usually arranged in a charging compartment of the vehicle body, which is covered or closed by a charging flap or a charging closure element. A mechanism that cooperates with the charging flap or charging closure element selectively allows the charging compartment to be opened and closed or the charging flap or charging closure element to be flipped open and closed relative to the charging compartment, and thus allows access to the charging port.

In vehicles with a combustion-based drive, a fuel tank is supplied with fuel via a tank filler-neck, which is accessible from the outside by connection to a fuel pump or a fuel nozzle, for example. Like the charging port, the filler neck is typically arranged in a filler neck housing that is associated with the vehicle body and is covered or closed by a fueling flap or a tank closure element. Here, too, a mechanism that cooperates with the fueling flap or tank closure element selectively allows the fueling compartment to be opened and closed or the fueling flap or tank closure element to be flipped open and closed relative to the fueling compartment, and thus allows access to the tank filler-neck.

Actuating mechanisms and actuating apparatuses for opening and closing a cover in or on a vehicle are generally known from the prior art, for example from DE 10 2008 057 933 B4, DE 10 2009 060 119 A1, DE 10 2011 101 838 A1, and DE 10 2012 004 078 A1.

Electric and hybrid vehicles are gaining attractiveness through ever increasing ranges. As a result, charging the energy reservoir (battery) of the electric and hybrid vehicles is becoming increasingly important. According to the solutions currently known, the conventional charging apparatuses are fixedly installed in the electric and hybrid vehicles. The user receives for this purpose merely one cable, which is used in order to connect the built-in charging apparatus with a charging station or socket outlet. Current charging apparatuses enable the motor vehicle to be recharged at an electrical outlet, for example at a household socket with a maximum of 2.3 kW or at an AC charging column with, for example, 3.6 kW.

As an additional option, the customer can order an AC wall box for power conversion from AC to DC in the motor vehicle or a DC wall box for power conversion from AC/DC in the wall box to the integrated charging apparatus.

Thus, electric or hybrid vehicles typically have combined charging outlets that can operate on both AC power and DC power. Some plugs only use the AC interface, so that the DC pins remain open during the charging operation and are exposed to weather and environmental conditions. In many cases, in order to protect the unoccupied pins, a manually removable or convertible protection apparatus is used, for example in the form of a cover. Plastic covers having a seal and a hinge and a locking apparatus are also known.

However, with respect to personal protection, it is also desirable that the live components, the electrical contacts of a plug face of the charging socket, be protected from being touched by a user. For this purpose, additional cover elements are regularly arranged as a cover between the compartment body cover (charging flap) and the plug face of the charging socket.

The disadvantage of the approaches known from the prior art can be seen in the fact that, when charging or preparing a charging operation, the user must always manually remove the protection apparatus for the charging plugs/pins/plug faces, even when the charging flap of the charging compartment is motor-driven.

This problem exists not only in charging compartment systems of the type described above, but also in fueling or service compartment systems having a plurality of optionally selectable fueling or service ports. Based on this problem, the problem addressed by the disclosure is to find a system that operates automatically and independently of the type of charging system, without a user being required to intervene.

SUMMARY

The present disclosure relates generally to compartment concepts in or on a vehicle, substantially as illustrated by and described in connection with at least one of the figures, as set forth more completely in the claims. More specifically, the disclosure relates to an arrangement configured as a charging, fueling, or service compartment, which is received or receivable on or in a body or outer skin component of a vehicle.

Accordingly, the disclosure relates to a charging, fueling, or service compartment system for a vehicle, wherein the charging, fueling, or service compartment system comprises a compartment body mounted or mountable in or on a body or outer skin component and at least one terminal or connection region, to which, as needed, a charging plug or an equipment gun can be connected or at least partially received, wherein the at least one terminal or connection region is formed at least regionally in an interior region of the compartment body.

The charging, fueling, or service compartment system preferably further comprises a compartment body cover, which can be moved as needed between a closed position in which the interior region of the compartment body is covered at least regionally by the compartment body cover, and an open position in which the interior region of the compartment body is accessible from the outside in such a way that a charging plug or a product gun can be connected to the at least one terminal or connection region or received at least regionally in the at least one terminal or connection region.

According to the disclosure, it is provided that the charging, fueling, or service compartment system comprises a cover associated with the at least one terminal or connection region, which can be moved between a closed position in which the at least one terminal or connection region is covered at least regionally and an open position in which the at least one terminal or connection region is accessible in such a way that a charging plug or a product gun can be connected to the at least one terminal or connection region or received at least regionally in the at least one terminal or connection region.

In particular, it is provided in the charging, fueling, or service compartment system that the cover associated with the at least one terminal or connection region is associated with a mechanism, which is directly or indirectly operatively connected to the compartment body cover in such a way that when the compartment body cover is transferred from its closed position into its open position, the cover associated with the at least one terminal or connection region is moved along in such a way that the cover associated with the at least one terminal or connection region is preferably moved synchronously from its closed position into its open position.

In this context, it is contemplated that the cover associated with the at least one terminal or connection region is associated with a biasing element, in the form of a spring element, which is configured in such a way that when the compartment body cover is transferred from its closed position into its open position, the cover associated with the at least one terminal or connection region is moved from its closed position into its open position counter to the biasing force of the biasing element.

In particular, the cover associated with the at least one terminal or connection region can be associated with an releasable locking mechanism, which is configured such that the cover associated with the at least one terminal or connection region, is releasably held in its open position after the cover associated with the at least one terminal or connection region has been moved from its closed position into its open position counter to the biasing force of the biasing element while the compartment body cover is transferred from its closed position into its open position.

According to realizations of the charging, fueling, or service compartment system, it is provided that the mechanism associated with the cover of the at least one terminal or connection region is configured such that the operative connection to the compartment body cover is interrupted after the cover associated with the at least one terminal or connection region has been moved from its closed position into its open position counter to the biasing force of the biasing element while the compartment body cover is transferred from its closed position into its open position.

In preferred design variants of the charging, fueling, or service compartment system according to the disclosure, the charging, fueling, or service compartment system comprises a first terminal or connection region and at least one further second terminal or connection region, wherein the first and the at least one second terminal or connection region are associated with a respective cover.

In particular in the aforementioned design variant of the charging, fueling, or service compartment system, it is contemplated that the locking mechanism, which is associated with cover associated with the first terminal or connection region, is arranged in such a way that the cover associated with the first terminal or connection region is no longer held in its open position when a charging plug or a product gun is connected to the at least one second terminal or connection region or received at least regionally in the at least one second terminal or connection region.

According to a further aspect of the present disclosure, the problem underlying the disclosure is solved by a charging, fueling, or service compartment system comprising a compartment body mounted or mountable on or in a body or outer skin component, at least one terminal or connection region to which a charging plug or a product gun can be connected or at least partially received as needed, and a compartment body cover. The at least one terminal or connection region is configured at least regionally in an interior region of the compartment body. The compartment body cover can be moved as needed between a closed position in which the interior region of the compartment body is covered at least regionally by the compartment body cover an open position in which the interior region of the compartment body is accessible from the outside in such a way that a charging plug or a product gun can be connected to the at least one terminal or connection region or received at least regionally in the at least one terminal or connection region.

As with the first aspect of the present disclosure, in the further aspect it is provided that the charging, fueling, or service compartment system comprises a cover associated with the at least one terminal or connection region, which can be moved between a closed position in which the at least one terminal or connection region is covered at least regionally and an open position in which the at least one terminal or connection region is accessible in such a way that a charging plug or a product gun can be connected to the at least one terminal or connection region or received at least regionally in the at least one terminal or connection region.

In the further aspect of the disclosure, it is provided that the cover associated with the at least one terminal or connection region is forcibly coupled to the compartment body cover such that, when the compartment body cover is moved from its closed position into its open position, the cover associated with the at least one terminal or connection region is also moved from its closed position into its open position. In the open position of the compartment body cover or in the open position of the cover associated with the at least one terminal or connection region, the forced coupling between the cover associated with the at least one terminal or connection region and the compartment body cover is interrupted.

The cover associated with the at least one terminal or connection region is associated with a connecting element, preferably in the form of a snap connecting element, with which the cover associated with the at least one terminal or connection region enters into operative connection when moving into its open position in such a way that the cover associated with the at least one terminal or connection region is releasably held in its open position with the aid of the connecting element.

In this context, it is suitable that the connecting element, which is configured in the form of a snap connecting element, is configured so as to lift the operative connection with the cover, which is in its open position, when a critical amount of a force component facing the closed position acts on the cover or is exceeded.

In order to implement this mechanism, it is conceivable that the cover comprises a lid region at least partially or regionally covering terminal or connection region in the closed position of the cover and a lever region that projects from the lid region such that the lever region extends at least partially or regionally into a region of the terminal or connection region in the open position of the cover.

Preferably, the region of the terminal or connection region into which the lever region of the cover projects at least partially or regionally in the open position of the cover is selected with respect to the terminal or connection region in such a way that the lever region is or can be contacted by the charging plug or the product gun when the charging plug or the product gun is connected to the terminal or connection region or received in the terminal or connection region.

According to realizations of the charging, fueling, or service compartment system of the present disclosure, it is provided that the cover associated with the at least one terminal or connection region is associated with a spring element, wherein, when moving the cover associated with the at least one terminal or connection region into its open position, the cover associated with the at least one terminal or connection region is moved counter to a spring force or biasing force of the spring element acting in the direction of the closed position of the cover associated with the at least one terminal or connection region.

According to realizations of the charging, fueling, or service compartment system according to the disclosure, it is provided that the cover associated with the at least one terminal or connection region is pivotably mounted about a first pivot axis relative to the compartment body. The compartment body cover is pivotably mounted about a second pivot axis relative to the compartment body.

Preferably, the first pivot axis runs parallel to, or at least substantially parallel to, the second pivot axis.

When transferring the cover associated with the at least one terminal or connection region from its closed position into its open position, the cover is pivoted in a first direction of rotation relative to the compartment body. When transferring the compartment body cover from its closed position into its open position, the compartment body cover is preferably pivoted in a second direction of rotation counter to the first direction of rotation relative to the compartment body.

According to embodiments of the charging, fueling, or service compartment system, it is provided that the forced coupling between the cover associated with the at least one terminal or connection region and the compartment body cover comprises an element for transferring a mechanical movement and/or for transferring at least tensile forces (hereinafter also referred to as the "transfer element"), which operatively connects the cover associated with the at least one terminal or connection region to the compartment body cover. In this context, in particular, it is provided that the transfer element is configured so as to be at least regionally or sectionally flexible.

It is contemplated in this context, for example, that the transfer element is configured at least regionally or sectionally as a Bowden system.

According to further developments of the charging, fueling, or service compartment system according to the disclosure, it is provided that the forced coupling between the cover associated with the at least one terminal or connection region and the compartment body cover comprises a lever element or the like, which is pivotably mounted about a pivot axis extending parallel to the pivot axis of the compartment body cover relative to the compartment body.

On the other hand, the compartment body cover comprises a control region, for example also embodied as a lever region. It is provided here that a movement of the control region resulting from the pivoting of the compartment body cover that occurs during the transition of the compartment body cover into its open position is or can be tapped by an edge region of the control region via an end region of the lever element.

In particular, the lever element and/or the control region of the compartment body cover is configured such that, in the open position of the compartment body cover, an operative contact between the first end region of the lever element and the edge region of the control region is lifted.

In this context, it is suitable that the forced coupling comprises a spring mechanism associated with the transfer element, which is configured so as to be tensioned when the compartment body cover is transferred into its open position for as long as there exists an operative contact between the first end region of the lever element and the edge region of the control region.

However, the disclosure is not limited to embodiments in which a forced coupling between the cover associated with the at least one terminal or connection region to the compartment body cover already exists when the compartment body cover is in its closed position.

Rather, it is also contemplated that the compartment body cover can be further movable from its open position into a transfer position, wherein the charging, fueling, or service compartment system comprises a corresponding coupling mechanism, which is configured so as to forcibly couple the cover associated with the at least one terminal or connection region to the compartment body cover upon achieving the open position of the compartment body cover or upon transferring the compartment body cover from its open position into the transfer position in such a way that when the compartment body cover is moved from its open position into its transfer position, the cover associated with the at least one terminal or connection region is moved from its closed position into its open position.

In this context, it is further contemplated that the coupling mechanism is further configured so as to lift the forced coupling between the cover associated with the at least one terminal or connection region and the compartment body cover when transferring the compartment body cover from its open position into its closed position.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
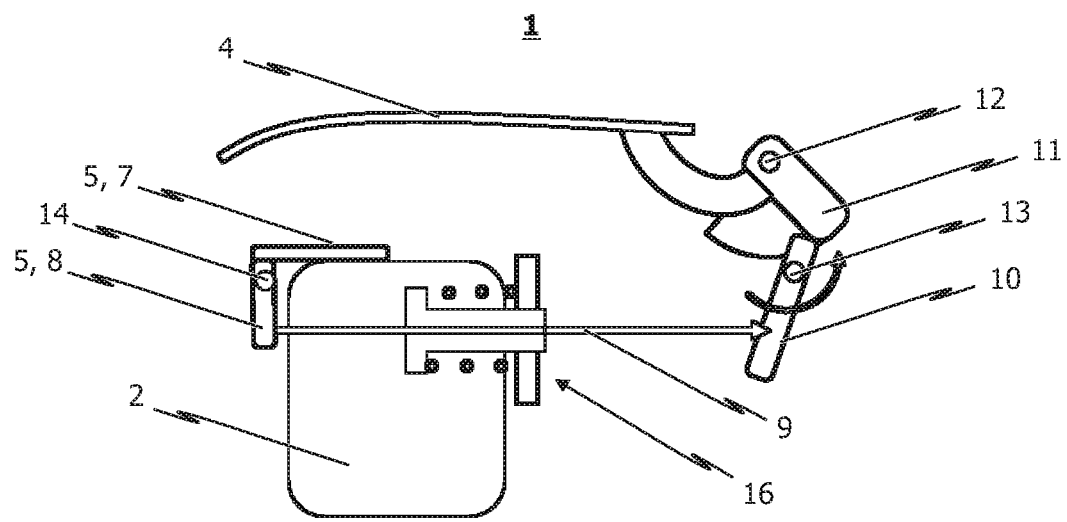
FIG. 1 illustrates, schematically, a first exemplary embodiment of the charging, fueling, or service compartment system according to the present disclosure in a state in which both the compartment body cover and the cover associated with the terminal or connection region are present in their closed position.
Figure 2:
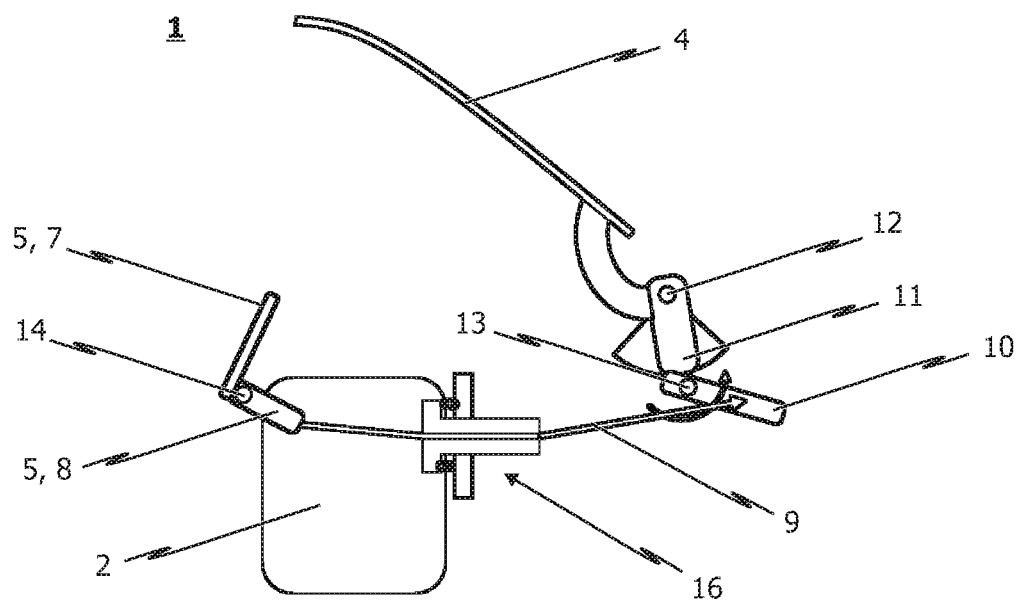
FIG. 2 illustrates, schematically, the embodiment of the charging, fueling, or service compartment system according to FIG. 1 when transferring the compartment body cover from its closed position according to FIG. 1 into its open position.
Figure 3:
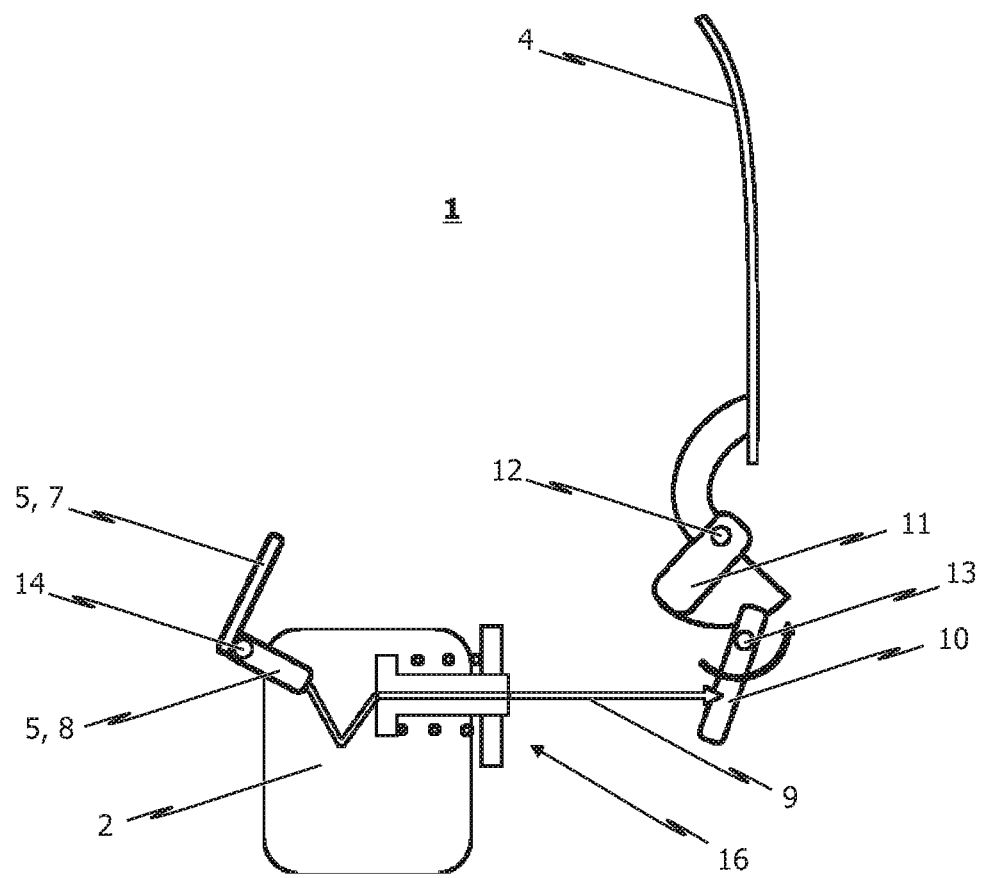
FIG. 3 illustrates, schematically, the exemplary embodiment of the charging, fueling, or service compartment system according to FIG. 1 in a state in which both the compartment body cover and the cover associated with the terminal or connection region are present in their open position.

The disclosure further relates to a charging apparatus for a battery of a motor vehicle, in particular an electric or hybrid vehicle, and a corresponding charging system. Furthermore, the disclosure relates to a charging system having a cover, in particular in the form of a charging, fueling, or service flap, and a charging, fueling, or service compartment, which is received or receivable on or in a body component of a vehicle, wherein the cover (i.e. the charging, fueling, or service flap in particular) is reversibly movable between a closed position and an open position relative to the charging, fueling, or service compartment. Finally, the disclosure further relates to a vehicle having such a charging system.

The vehicle is in particular a vehicle having a hybrid or electric drive, wherein however vehicles having a purely combustion-based drive are not excluded in the context of the present disclosure.

The terms "fueling flap" and "fueling compartment" as used herein are not understood to mean only the components associated with a fuel fueling or the components necessary for filling a fuel tank. Rather, these terms are also intended to include components for a tank for receiving other resources, for example AdBlue or urea, or an additive such as water. Accordingly, the disclosure also relates to actuating mechanisms for actuating service flaps associated with a filling system for a resource or additive fueling, in particular a fuel, AdBlue, or water tank.

The charging compartment systems 1 shown schematically in the accompanying drawings comprise a compartment body (not shown), which is mounted or mountable on a body or outer skin component of the vehicle. In at least some regions, a terminal or connection region 2 is configured in an interior region of the compartment body, to which a charging plug 3 (or, in the case of a fueling or service compartment system, a product gun) can be connected or at least partially received.

The exemplary embodiments of the charging compartment system 1 according to the disclosure further comprise a compartment body cover 4 (charging flap), which is movable between a closed position and an open position, as needed. In the closed position of the compartment body cover 4, the interior region of the compartment body is covered at least regionally by the compartment body cover 4. In the open position of the compartment body cover 4, on the other hand, the interior region of the compartment body is accessible from the outside such that a charging plug 3 (or possibly a product gun, in the case of a fueling or service compartment system) can be connected to the terminal or connection region 2 or can be at least partially received in the terminal or connection region 2.

In addition to the compartment body cover 4, the exemplary embodiments of the charging compartment system according to the disclosure have a cover 5 associated with the terminal or connection region 2. This cover 5 is also movable between a closed position and an open position. In the closed position of the cover 5 assigned to the terminal or connection region 2, the terminal or connection region 2 is correspondingly covered at least regionally. In the open position of the cover 5 associated with the terminal or connection region 2, on the other hand, the connection region 2 is accessible such that a charging plug 3 (or, in the case of a fueling or service compartment system, an operating gun) can be connected to the connection region 2 or can be at least regionally received in the terminal or connection region 2.

To increase the comfort of a vehicle user, the charging process, and in particular the insertion of the charging plug 3 into the terminal or connection region 2 of the charging compartment system 1, is carried out automatically or in a piloted manner. Here, for example, it is possible for the charging plug 3 to be guided by a robotic system and inserted into the terminal or connection region 2 (charging socket) and removed after the charging process.

In particular for a DC charging in which the vehicle battery is charged with a direct current (DC), combo-1 or combo-2 charging plugs are regularly used as the terminal or connection region 2, in which a cover 5 associated with the terminal or connection region 2 must be removed manually by a vehicle user prior to a charging operation due to its design.

Thus, in particular in the case of a DC charging, the problem arises that a manual intervention of the vehicle user is necessary in order to release the terminal or connection region 2, which is in particular embodied as a charging socket, whereby the user comfort of the automatic or piloted charging process is disadvantageously reduced.

Thus, the disclosure also in particular addresses the problem of providing an optimized charging interface for a charging system serving an electrically driven or drivable vehicle, wherein the charging system is in particular improved with regard to an automatic or piloted charging process.

A first exemplary embodiment of the charging, fueling, or service compartment system according to the present disclosure is shown in FIG. 1 to FIG. 8. The system shown therein is embodied in particular as a charging compartment system 1.

The first exemplary embodiment of the disclosure shown in FIG. 1 to FIG. 8 is in particular wherein the cover 5 associated with the terminal or connection region 2 is forcibly coupled to the compartment body cover 4 such that, when the compartment body cover 4 is moved from its closed position into its open position, the cover 5 associated with the terminal or connection region 2 is also moved from its closed position into its open position. In the open position of the compartment body cover 4 or in the open position of the cover 5 associated with the terminal or connection region 2, on the other hand, the forced coupling between the cover 5 associated with the terminal or connection region 2 and the compartment body cover 4 is interrupted (cf. FIG. 3).

Figure 12:
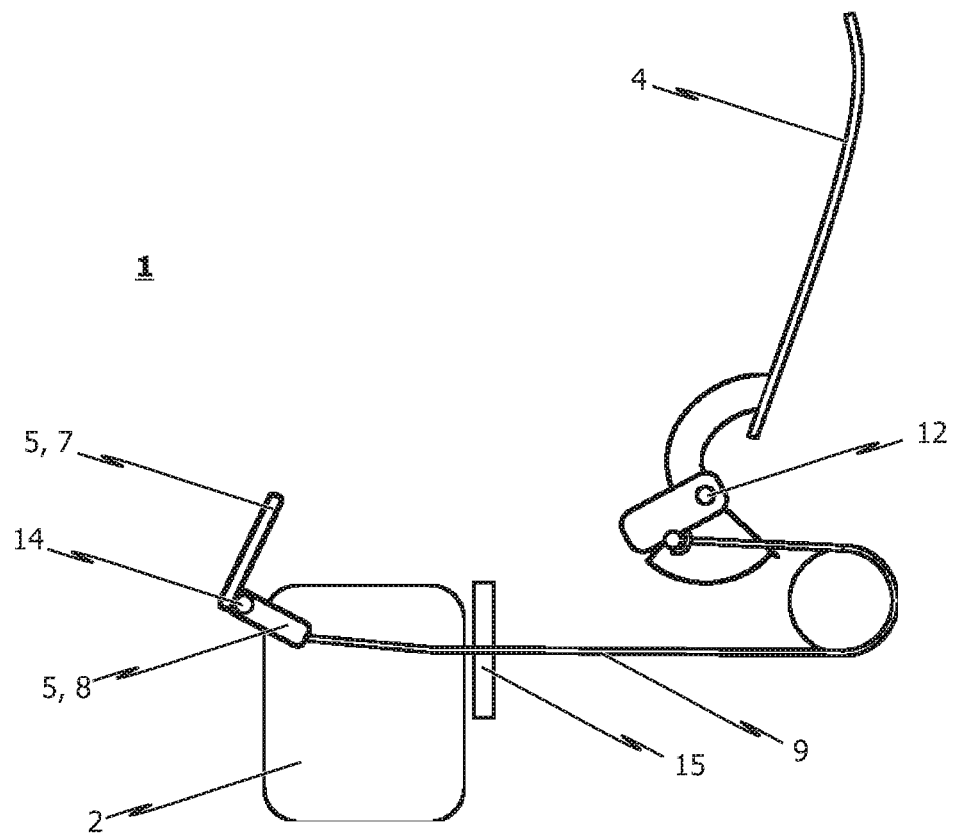
FIG. 12 illustrates, schematically, the exemplary embodiment of the charging, fueling, or service compartment system according to FIG. 11 in a state in which the compartment body cover is moved from its open position according to FIG. 11 into its transfer position.
Figure 13:
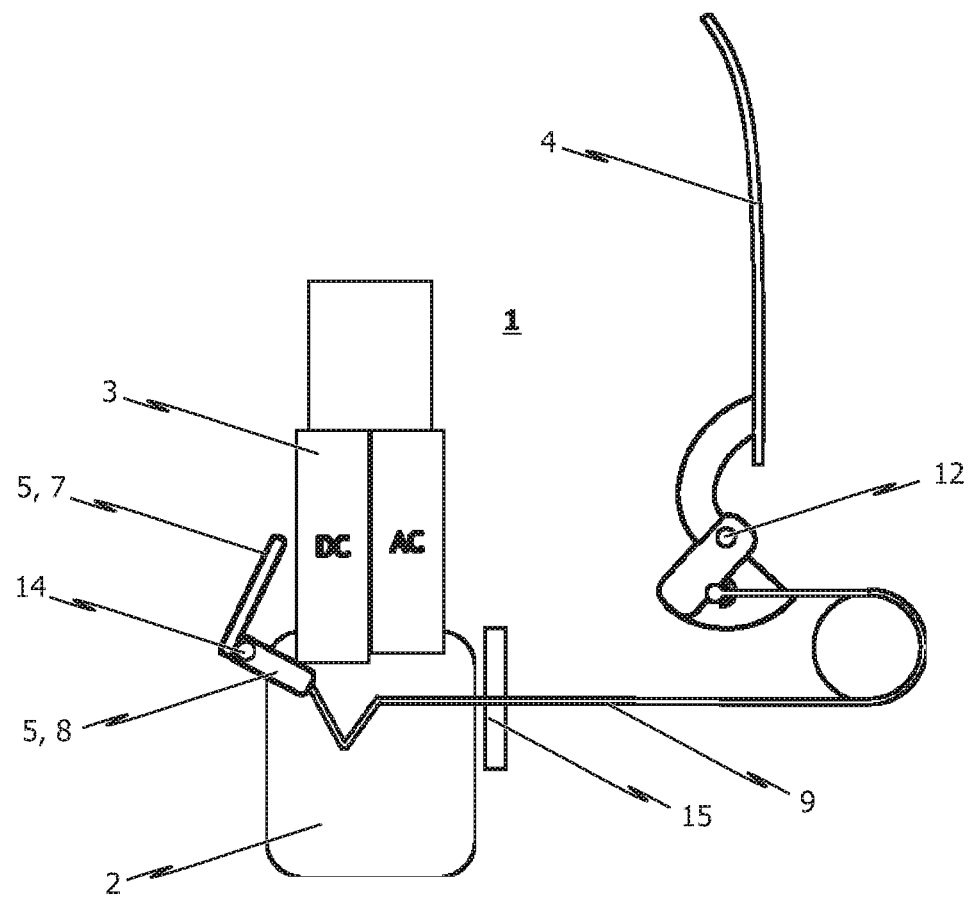
FIG. 13 illustrates, schematically, the exemplary embodiment of the charging, fueling, or service compartment system according to FIG. 12 in a state in which the compartment body cover has been moved back into its open position from its transfer position according to FIG. 12.

On the other hand, the second exemplary embodiment of the charging, fueling, or service compartment system, also embodied as a charging system and shown in FIG. 9 to FIG. 16, is wherein the compartment body cover 4 is further movable from its open position into a transfer position (cf. FIG. 12). The charging compartment system 1 comprises a coupling mechanism, which is configured so as to forcibly couple the cover 5 associated with the terminal or connection region 2 to the compartment body cover 4 only upon achieving the open position of the compartment body cover 4 (cf. FIG. 11) or only upon transferring the compartment body cover 4 from its open position into the transfer position (cf. FIG. 12) in such a way that when the compartment body cover 4 is moved from its open position into its transfer position, the cover 5 associated with the terminal or connection region 2 is moved from its closed position into its open position (cf. FIG. 12).

In the second exemplary embodiment of the charging compartment system 1 according to the disclosure, it is further provided that the coupling mechanism of the charging compartment system 1 is further configured so as to lift the forced coupling between the cover 5 associated with the terminal or connection region 2 and the compartment body cover 4 when the compartment body cover 4 is moved from its open position into its closed position.

Both design variants of the charging compartment system 1 according to the disclosure have in common the fact that the cover 5 associated with the terminal or connection region 2 is associated with a connecting element 6 in the form of a snap connecting element, with which the cover 5 associated with the terminal or connection region 2 enters into operative connection when moving into its open position in such a way that the cover 5 associated with the terminal or connection region 2 is releasably held in its open position with the aid of the snap connecting element 6. In this context, reference is made further to the illustration in FIG. 3, FIG. 4 or FIG. 12, and FIG. 13.

In particular, it is provided that the connecting element 6, which is in particular configured in the form of a snap connecting element, is configured so as to lift the operative connection with the cover 5, which is in its open position, when a critical amount of a force component facing the closed position acts on the cover 5 or is exceeded.

As shown in the drawings, the snap connecting element 6 can in particular be triggered by a charging plug 3 when the charging plug 3 is inserted into the terminal or connection region 2. The exemplary embodiments shown are a DC charging plug.

It is provided that the cover 5 associated with the terminal or connection region 2 comprises a lid region 7, which at least partially or regionally covers the terminal or connection region 2 in the closed position of the cover 5, and a lever region 8. In the design variants of the charging compartment system 1 according to the disclosure shown in the drawings, the lid region 7 of the cover 5 serves to cover only the DC terminal or connection region, but not the adjacently arranged AC terminal or connection region.

The lever region 8 of the cover 5 projects from the lid region 7 of the cover 5 such that the lever region 8 at least partially or regionally extends into a region of the DC terminal or connection region in the open position of the cover 5.

If it is then attempted to insert a DC charging plug 3 into the DC terminal or connection region 2, the charging plug 3 inevitably contacts the lever region 8 of the cover 5, which is in the open position, at least partially or regionally projecting into the region of the terminal or connection region 2, and as a result, the snap connecting element 6 is triggered and an operative connection between the snap connecting element 6 and the cover 5, which is in its open position, is lifted.

The cover 5 associated with the terminal or connection region 2 is advantageously associated with a spring element, wherein, when the cover 5 associated with the terminal or connection region 2 is moved into its open position, the cover 5 associated with the terminal or connection region 2 is moved counter to a spring force or biasing force of the spring element acting in the direction of the closed position of the cover 5.

Figure 5:
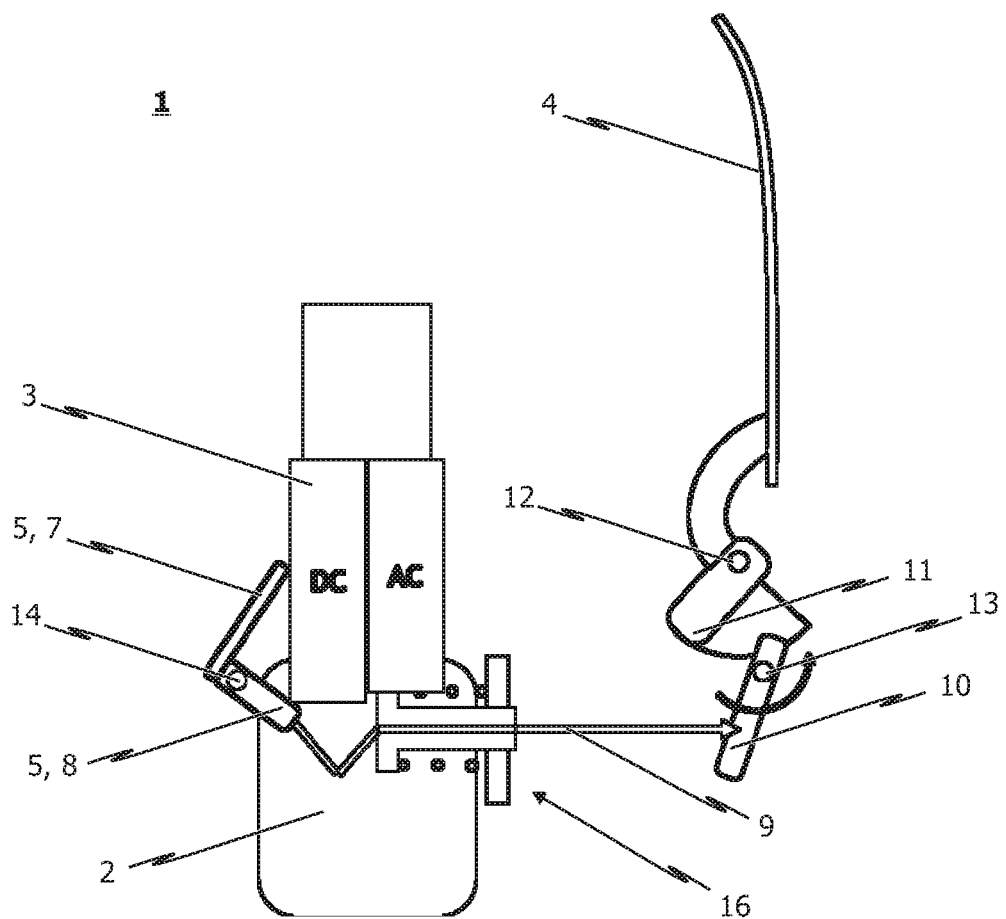
FIG. 5 illustrates, schematically, the exemplary embodiment of the charging, fueling, or service compartment system according to FIG. 4 in a state after the charging plug has been connected to the terminal or connection region.
Figure 14:
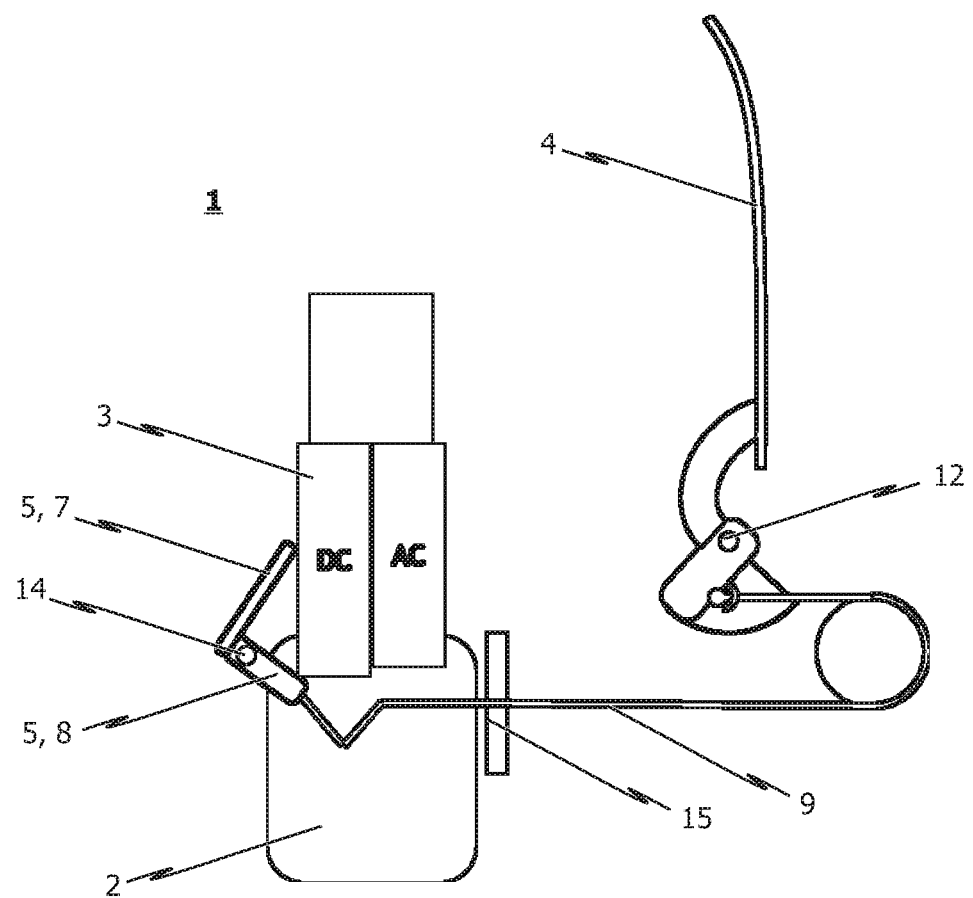
FIG. 14 illustrates, schematically, the exemplary embodiment of the charging, fueling, or service compartment system according to FIG. 13 in a state after a charging plug has been connected to the terminal or connection region.
Figure 15:
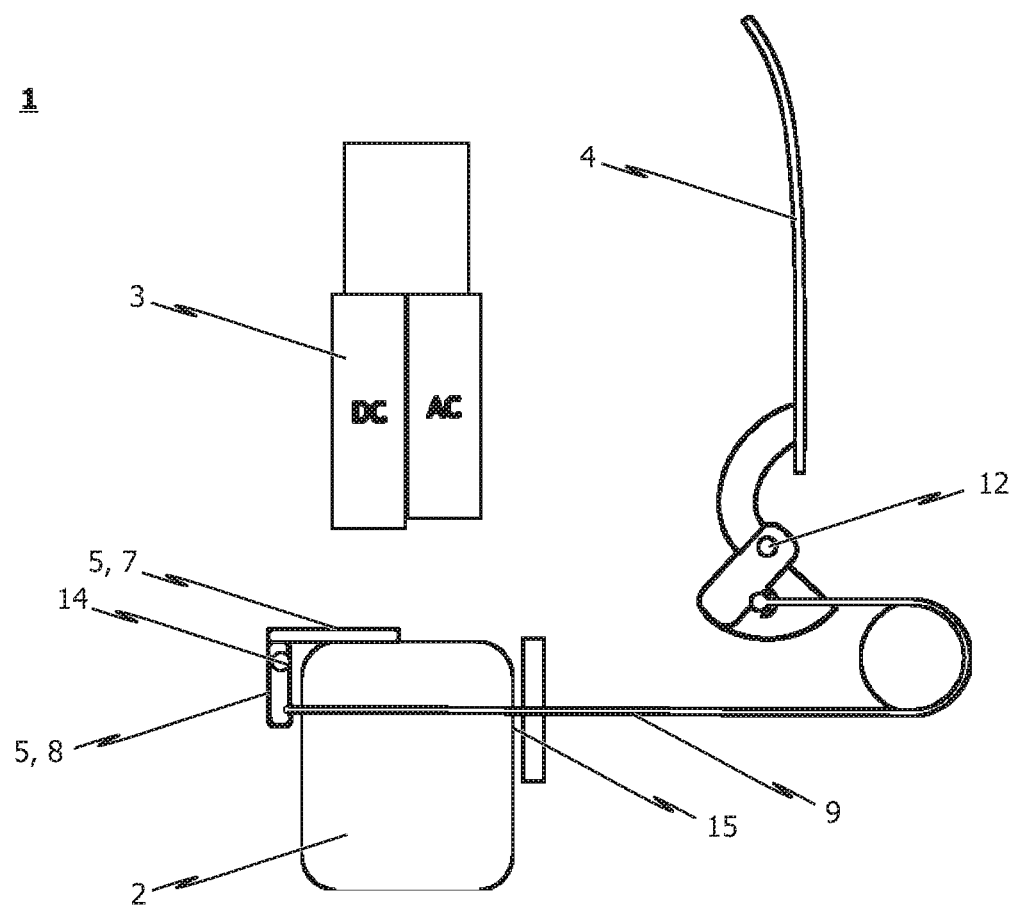
FIG. 15 illustrates, schematically, the exemplary embodiment of the charging, fueling, or service compartment system according to FIG. 14 in a state in which the charging plug has been removed from the terminal or connection region.
Figure 16:
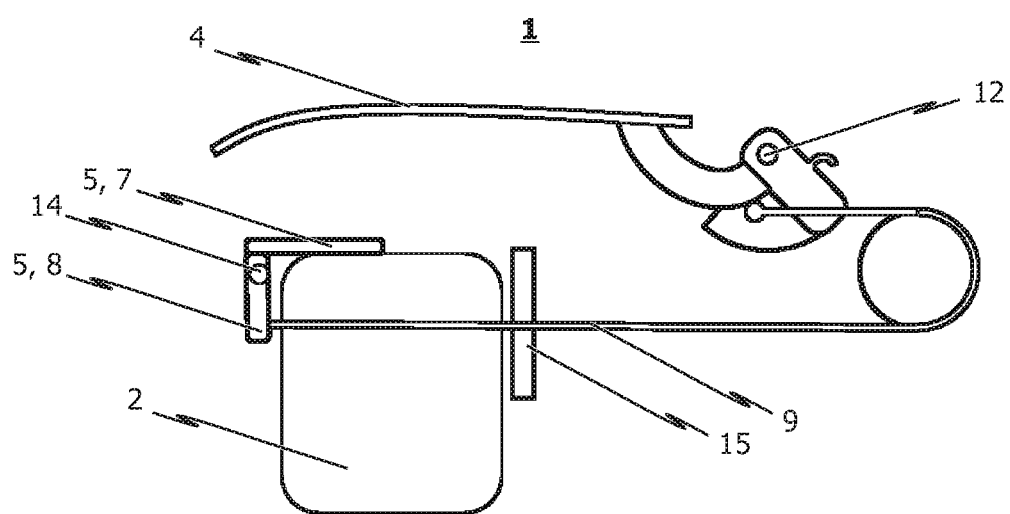
FIG. 16 illustrates, schematically, the exemplary embodiment of the charging, fueling, or service compartment system according to FIG. 15 in a state after the compartment body cover has been moved from its open position according to FIG. 15 back into its closed position according to FIG. 16.

This results in the cover 5 and in particular the lid region 7 of the cover 5 automatically abutting the DC charging plug 3 after the triggering of the snap connecting element 6, as shown in FIG. 5 and FIG. 14.

An element 9 for transferring a mechanical movement and/or for transferring at least tensile forces is preferably used in order to forcibly couple the cover 5 associated with the terminal or connection region 2 and the compartment body 4. This transfer element 8 connects the cover 5 associated with the terminal or connection region 2 to the compartment body cover 4. In the terminal or connection region 2, the transfer element 8 is preferably configured so as to be at least regionally or sectionally flexible. For example, a Bowden system is suitable as the transfer element 8.

The first exemplary embodiment of the charging compartment system 1 according to the disclosure shown schematically in FIG. 1 to FIG. 8 comprises a lever element 10, which is pivotably mounted about the pivot axis 13 extending parallel to the pivot axis 12 of the compartment body cover 4 in order to form a forced coupling between the cover 5 associated with the terminal or connection region 2 and the compartment body cover 4. In addition, it is provided that the compartment body cover 4 comprises a control region 11. A movement of the control region 11 resulting from the pivoting of the compartment body cover 4 that occurs during the transition of the compartment body cover 4 into its open position can be tapped by an edge region of the control region 11 via an end region of the lever element 10.

Figure 4:
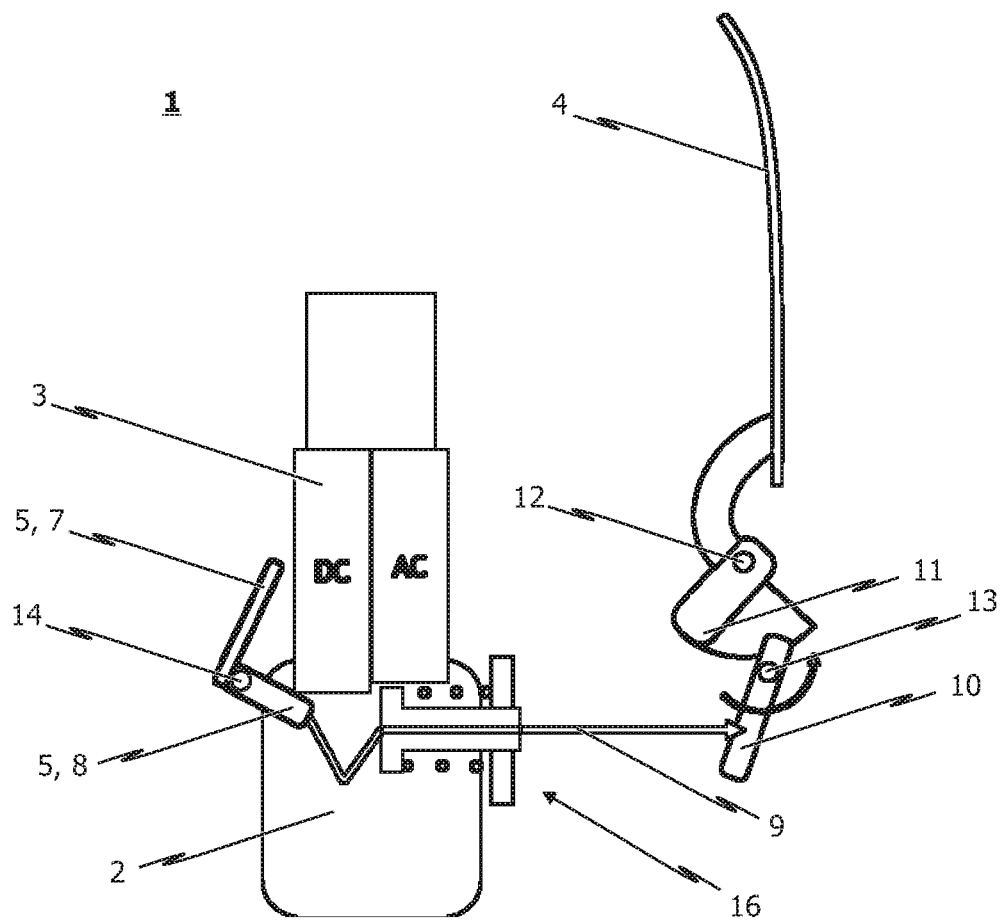
FIG. 4 illustrates, schematically, the exemplary embodiment of the charging, fueling, or service compartment system according to FIG. 3 in a state in which a charging plug is inserted into the terminal or connection region.
Figure 6:
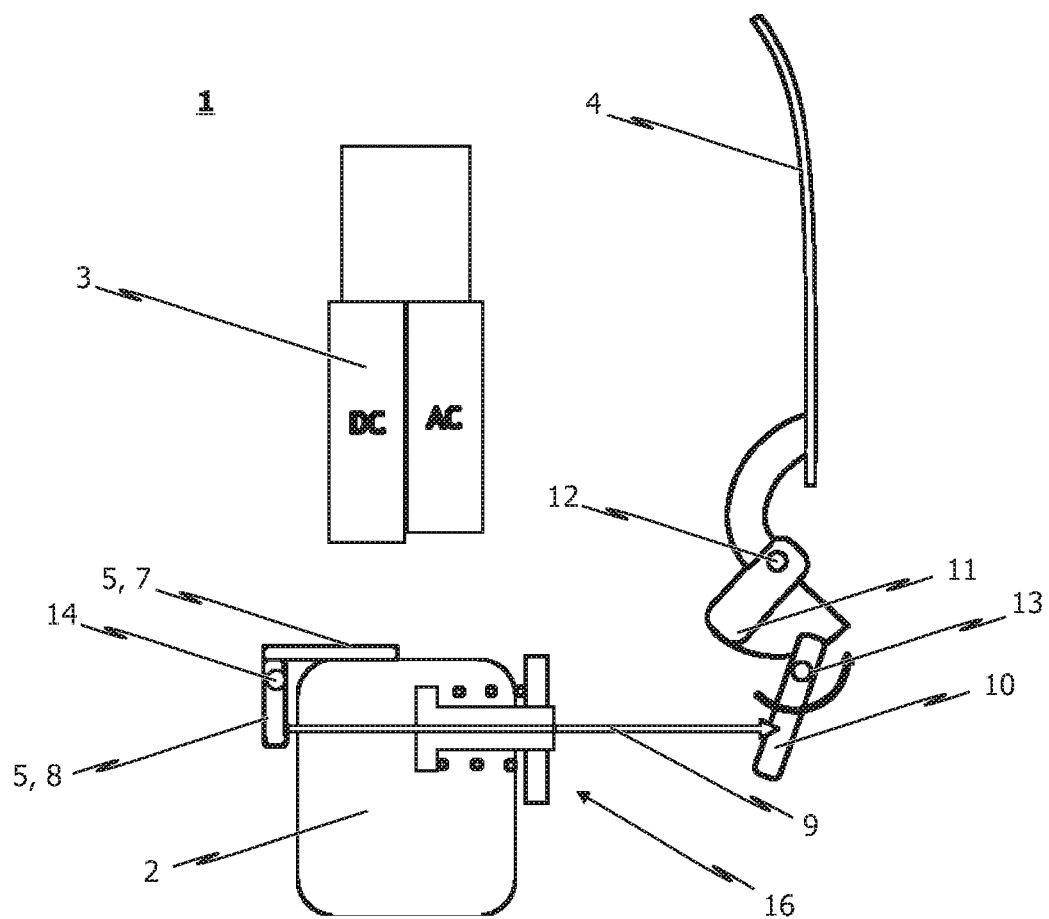
FIG. 6 illustrates, schematically, the exemplary embodiment of the charging, fueling, or service compartment system according to FIG. 5 in a state after the charging plug has been removed from the terminal or connection region.
Figure 7:
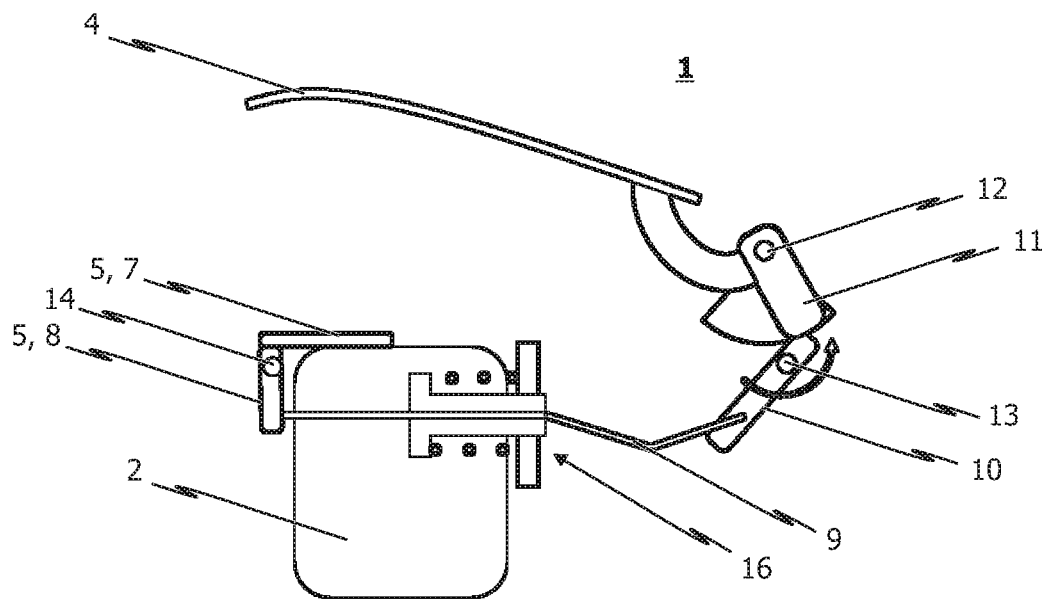
FIG. 7 illustrates, schematically, the exemplary embodiment of the charging, fueling, or service compartment system according to FIG. 6 in a state in which the compartment body cover is moved from its open position into the closed position.
Figure 8:
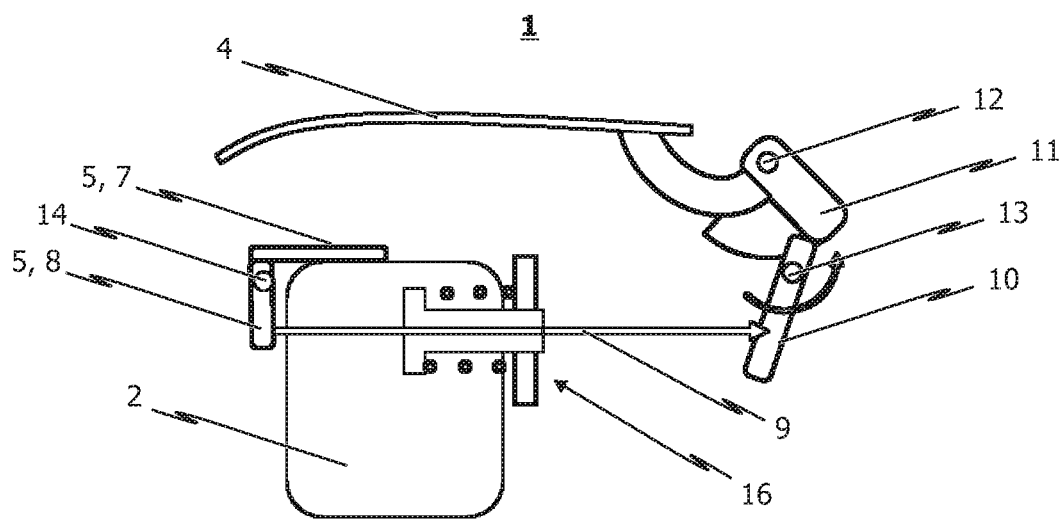
FIG. 8 illustrates, schematically, the exemplary embodiment of the charging, fueling, or service compartment system according to FIG. 7 upon reaching the closed position of the compartment body cover.
Figure 9:
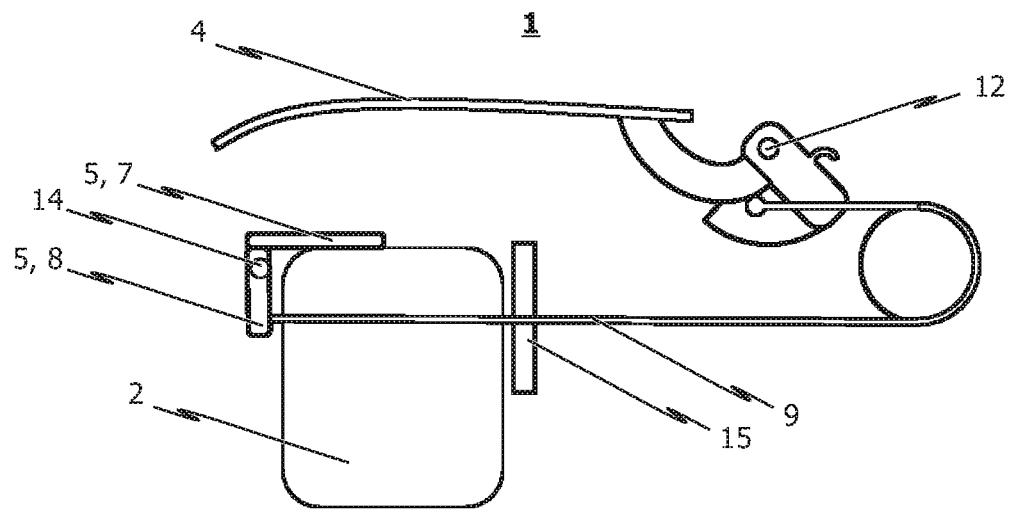
FIG. 9 illustrates, schematically, a second exemplary embodiment of the charging, fueling, or service compartment system according to the present disclosure in a state in which both the compartment body cover and the cover associated with the terminal or connection region are present in their closed position.
Figure 10:
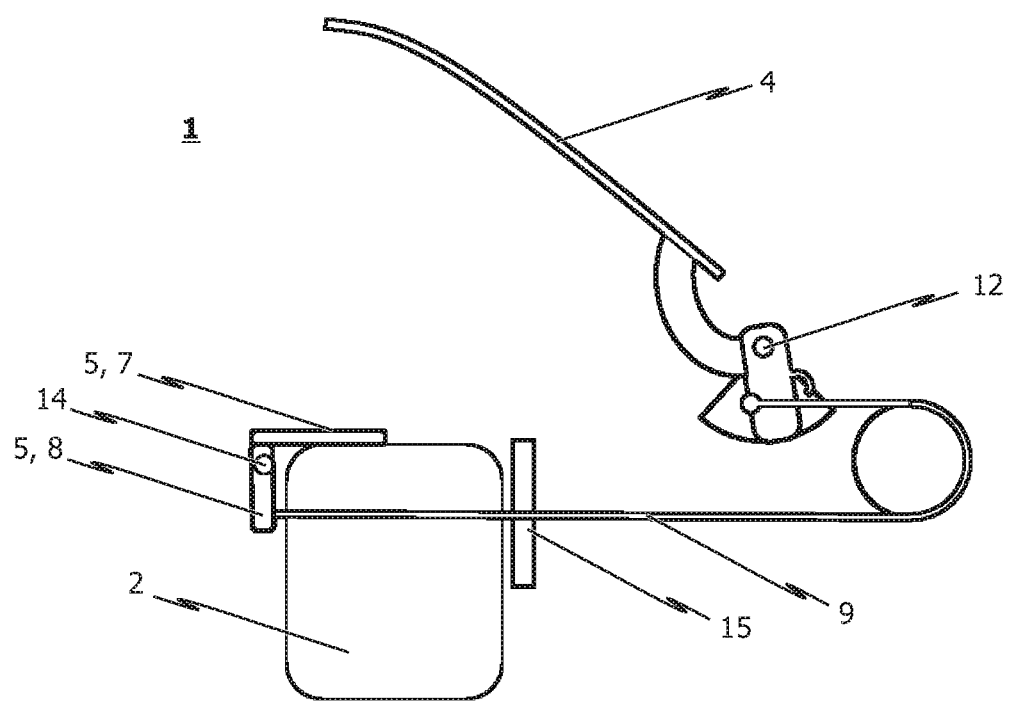
FIG. 10 illustrates, schematically, the exemplary embodiment of the charging, fueling, or service compartment system according to FIG. 9 in a state in which the compartment body cover is transferred from its closed position according to FIG. 9 into its open position.
Figure 11:
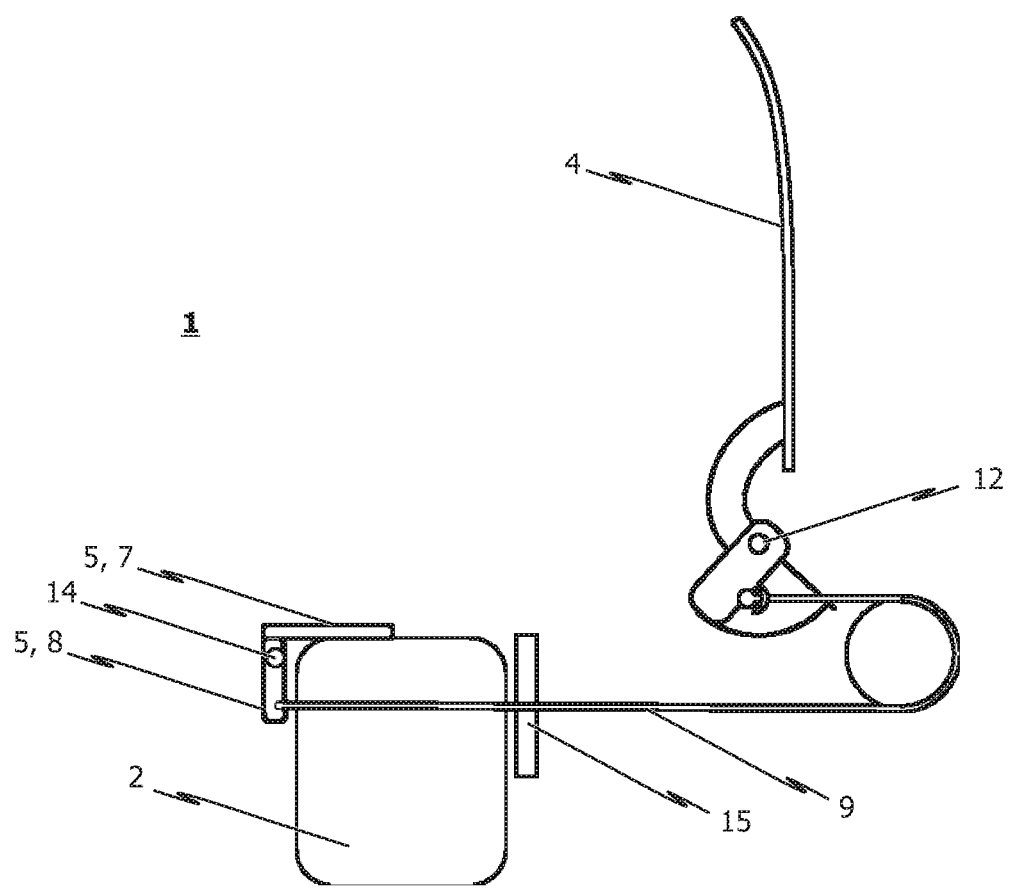
FIG. 11 illustrates, schematically, the exemplary embodiment of the charging, fueling, or service compartment system according to FIG. 10 in a state in which the compartment body cover is in its open position.

For example, as can be seen from the illustration in FIG. 4 to FIG. 6, the lever element 10 and the control region 11 of the compartment body cover 4 are configured such that, in the open position of the compartment body cover 4, an operative contact between the first end region of the lever element 10 and the edge region of the control region 11 is lifted.

In the first exemplary embodiment of the charging compartment system 1 according to the disclosure, it is further provided that the forced coupling comprises a spring mechanism 16 associated with the transfer element 8, which is configured so as to be tensioned when the compartment body cover 4 is transferred into its open position, namely for as long as there exists an operative contact between the first end region of the lever element 10 and the edge region of the control region 11.

In particular, it is provided that the transfer element 8 of the forced coupling is fixed to a second end region of the lever element 10 opposite the first end region of the lever element 10.

With regard to the second exemplary embodiment according to FIG. 9 to FIG. 16, it is further noted that the coupling mechanism used therein comprises a stop element 15, which is associated with the transfer element 8.

The embodiments of the charging compartment system 1 according to the disclosure shown in the drawings are wherein the cover 5 associated with the terminal or connection region 2 is pivotably mounted about a first pivot axis 14 relative to the compartment body, wherein the compartment body cover 4 is pivotally mounted about a second pivot axis 12 relative to the compartment body. The first pivot axis 14 runs preferably parallel or at least substantially parallel to the second pivot axis 12.

When transferring the cover 5 associated with the terminal or connection region 2 from its closed position into its open position, the cover 5 is pivoted in a first direction of rotation relative to the compartment body, wherein, when transferring the compartment body cover 4 from its closed position into its open position, the compartment body cover 4 is pivoted in a second direction of rotation opposite the first direction of rotation relative to the compartment body.

The present disclosure is not limited to the embodiment shown in the figures. Rather, it results from a summary of all the features shown in the figures.

What is claimed is:

1. A charging, fueling, or service compartment system for a vehicle, wherein the charging, fueling, or service compartment system comprises the following:
    a compartment body that is mounted or mountable to a body or outer skin component;
    at least one terminal or connection region, to which a charging plug or a product gun can be connected or received at least regionally as needed, wherein the at least one terminal or connection region is configured at least regionally in an interior region of the compartment body; and
    a compartment body cover, which can be moved as needed between a closed position in which the interior region of the compartment body is covered at least regionally by the compartment body cover and an open position in which the interior region of the compartment body is accessible from the outside in such a way that a charging plug or a product gun can be connected to the at least one terminal or connection region or received at least regionally in the at least one terminal or connection region,
    wherein the charging, fueling, or service compartment system comprises a cover associated with the at least one terminal or connection region, which can be moved between a closed position in which the at least one terminal or connection region is covered at least regionally and an open position in which the at least one terminal or connection region is accessible in such a way that a charging plug or a product gun can be connected to the at least one terminal or connection region or received at least regionally in the at least one terminal or connection region, and
    wherein the cover associated with the at least one terminal or connection region is associated with a mechanism, which is directly or indirectly operatively connected to the compartment body cover in such a way that when the compartment body cover is transferred from its closed position into its open position, the cover associated with the at least one terminal or connection region is moved along in such a way that the cover associated with the at least one terminal or connection region is moved synchronously from its closed position into its open position.

2. The charging, fueling, or service compartment system according to claim 1, wherein the cover associated with the at least one terminal or connection region is associated with a biasing element, in the form of a spring element, which is configured in such a way that when the compartment body cover is transferred from its closed position into its open position, the cover associated with the at least one terminal or connection region is moved from its closed position into its open position counter to a biasing force of the biasing element.

3. The charging, fueling, or service compartment system according to claim 2, wherein the cover associated with the at least one terminal or connection region is associated with a releasable locking mechanism, which is configured such that the cover associated with the at least one terminal or connection region, is releasably held in its open position after the cover associated with the at least one terminal or connection region has been moved from its closed position into its open position counter to the biasing force of the biasing element while the compartment body cover is transferred from its closed position into its open position.

4. The charging, fueling, or service compartment system according to claim 3, wherein the charging, fueling, or service compartment system comprises a first terminal or connection region and at least one second terminal or connection region, wherein the first terminal and the at least one second terminal or connection region are associated with a respective cover.

5. The charging, fueling, or service compartment system according to claim 4, wherein the releasable locking mechanism associated with the cover associated with the first terminal or connection region is configured such that the cover associated with the first terminal or connection region is no longer held in its open position when a charging plug or a product gun is connected to the at least one second terminal or connection region or received at least regionally in the at least one second terminal or connection region.

6. The charging, fueling, or service compartment system according to claim 2, wherein the mechanism associated with the cover of the at least one terminal or connection region is configured such that an operative connection to the compartment body cover is interrupted after the cover associated with the at least one terminal or connection region has been moved from its closed position into its open position counter to the biasing force of the biasing element while the compartment body cover is transferred from its closed position into its open position.

7. The charging, fueling, or service compartment system according to claim 1, wherein the cover associated with the at least one terminal or connection region is forcibly coupled to the compartment body cover such that when the compartment body cover is moved from its closed position into its open position, the cover associated with the at least one terminal or connection region is also moved from its closed position into its open position, wherein, in the open position of the compartment body cover or in the open position of the cover associated with the at least one terminal or connection region, a forced coupling between the cover associated with the at least one terminal or connection region and the compartment body cover is interrupted.

8. The charging, fueling, or service compartment system according to claim 7, wherein the cover associated with the at least one terminal or connection region is associated with a connecting element, in the form of a snap connecting element, with which the cover associated with the at least one terminal or connection region enters into an operative connection when moving into its open position in such a way that the cover associated with the at least one terminal or connection region is releasably held in its open position with the aid of the connecting element.

9. The charging, fueling, or service compartment system according to claim 8, wherein the connecting element, which is configured in the form of a snap connecting element, is configured so as to lift the operative connection with the cover, which is in its open position, when a critical amount of a force component facing the closed position acts on the cover or is exceeded.

10. The charging, fueling, or service compartment system according to claim 7, wherein the cover associated with the at least one terminal or connection region is associated with a spring element, wherein, when moving the cover associated with the at least one terminal or connection region into its open position, the cover associated with the at least one terminal or connection region is moved counter to a spring force or biasing force of the spring element acting in the direction of the closed position of the cover associated with the at least one terminal or connection region.

11. The charging, fueling, or service compartment system according to claim 7, wherein the forced coupling between the cover associated with the at least one terminal or connection region and the compartment body cover comprises a transfer element for transferring a mechanical movement and/or for transferring at least tensile forces, which connects the cover associated with the at least one terminal or connection region to the compartment body cover, wherein the transfer element is configured so as to be at least regionally or sectionally flexible.

12. The charging, fueling, or service compartment system according to claim 11, wherein the transfer element is configured at least regionally or sectionally as a Bowden system.

13. The charging, fueling, or service compartment system according to claim 7, wherein the forced coupling between the cover associated with the at least one terminal or connection region and the compartment body cover comprises a lever element, which is pivotably mounted about a pivot axis extending parallel to the pivot axis of the compartment body cover, wherein the compartment body cover comprises a control region, and wherein, via a first end region of the lever element, a movement of the control region resulting from the pivoting of the compartment body cover during the transfer of the compartment body cover into its open position is or can be tapped by an edge region of the control region.

14. The charging, fueling, or service compartment system according to claim 13, wherein the lever element and/or the control region of the compartment body cover is configured such that, in the open position of the compartment body cover, an operative contact between the first end region of the lever element and the edge region of the control region is lifted.

15. The charging, fueling, or service compartment system according to claim 13, wherein the forced coupling comprises a spring mechanism associated with the transfer element, which is configured so as to be tensioned when the compartment body cover is transferred into its open position, namely for as long as there exists an operative contact between the first end region of the lever element and the edge region of the control region.

16. The charging, fueling, or service compartment system according to claim 13, wherein the transfer element of the forced coupling is fixed to a second end region of the lever element opposite the first end region of the lever element.

17. The charging, fueling, or service compartment system according to claim 1, wherein the cover associated with the at least one terminal or connection region comprises a lid region, which at least partially or regionally covers the at least one terminal or connection region in the closed position of the cover, and a lever region, which projects from the lid region in such a way that, in the open position of the cover, the lever region projects at least partially or regionally into a region of the terminal or connection region.

18. The charging, fueling, or service compartment system according to claim 17, wherein the region of the terminal or connection region into which the lever region of the cover projects at least partially or regionally in the open position of the cover is selected with respect to the terminal or connection region in such a way that the lever region is or can be contacted by the charging plug or the product gun when the charging plug or the product gun is connected to the terminal or connection region or received in the terminal or connection region.

19. The charging, fueling, or service compartment system according to claim 1, wherein the cover associated with the at least one terminal or connection region is pivotally mounted about a first pivot axis relative to the compartment body, wherein the compartment body cover is pivotally mounted about a second pivot axis relative to the compartment body, wherein the first pivot axis extends parallel or at least substantially parallel to the second pivot axis, and wherein, when the cover associated with the at least one terminal or connection region is transferred from its closed position into its open position, the cover is pivoted in a first direction of rotation relative to the compartment body, and wherein, when the compartment body cover is transferred from its closed position into its open position, the compartment body cover is preferably pivoted in a second direction of rotation opposite the first direction of rotation relative to the compartment body.

20. The charging, fueling, or service compartment system according to claim 1, wherein the compartment body cover is further movable from its open position into a transfer position, wherein the charging, fueling, or service compartment system comprises a coupling mechanism, which is configured so as to forcibly couple the cover associated with the at least one terminal or connection region to the compartment body cover upon achieving the open position of the compartment body cover or upon transferring the compartment body cover from its open position into the transfer position in such a way that when the compartment body cover is moved from its open position into its transfer position, the cover associated with the at least one terminal or connection region is moved from its closed position into its open position.

21. The charging, fueling, or service compartment system according to claim 20, wherein the coupling mechanism is further configured so as to lift a forced coupling between the cover associated with the at least one terminal or connection region and the compartment body cover when transferring the compartment body cover from its open position into its closed position.

\* \* \* \* \*